United States Patent
Wong

(10) Patent No.: US 10,105,013 B2
(45) Date of Patent: Oct. 23, 2018

(54) SCOOP FOR FOODSTUFF, PARTICULARLY FOR ICE CREAM

(71) Applicant: KING'S FLAIR DEVELOPMENT LTD., Hong Kong (HK)

(72) Inventor: Siu Wah Wong, Hong Kong (HK)

(73) Assignee: KING'S FLAIR DEVELOPMENT LTD., Hong Kong (CN)

( * ) Notice: Subject to any disclaimer, the term of this patent is extended or adjusted under 35 U.S.C. 154(b) by 381 days.

(21) Appl. No.: 14/984,019

(22) Filed: Dec. 30, 2015

(65) Prior Publication Data

US 2016/0192811 A1    Jul. 7, 2016

Related U.S. Application Data

(60) Provisional application No. 62/099,432, filed on Jan. 2, 2015.

(51) Int. Cl.
  *A23G 9/00* (2006.01)
  *A47J 43/28* (2006.01)

(52) U.S. Cl.
  CPC .................. *A47J 43/282* (2013.01)

(58) Field of Classification Search
  CPC ....................................... A47J 43/282
  USPC ......................... 425/276, 279, 282
  See application file for complete search history.

(56) References Cited

U.S. PATENT DOCUMENTS

| 4,699,582 A  * | 10/1987 | Chen ...................... A47J 43/282 |
| | | 425/281 |
| 2006/0182835 A1* | 8/2006 | Jeon ....................... A47J 43/282 |
| | | 425/281 |

\* cited by examiner

*Primary Examiner* — Timothy Kennedy
(74) *Attorney, Agent, or Firm* — Nyemaster Goode P.C.

(57) ABSTRACT

This invention relates to a foodstuff scoop, particularly an ice cream scoop comprising a pushing portion that can be easily detached from and mounted onto a handle of the scoop. The pushing portion comprises a pushing piece for pushing scooped foodstuff out of a scoop portion of the scoop, and a retractable member for retracting the pushing piece from an active position to an inactive position after the scooped foodstuff has been pushed out of the scoop portion.

20 Claims, 8 Drawing Sheets

SCOOP FOR FOODSTUFF, PARTICULARLY FOR ICE CREAM

TECHNICAL FIELD OF THE INVENTION

This invention relates generally to a foodstuff scoop, particularly an ice cream scoop comprising a pushing portion that extends in use and retracts after use.

BACKGROUND OF THE INVENTION

Currently available ice cream scoops typically comprise a handle and a bowl-shaped scoop portion. Some of these scoops further comprise a pushing portion for pushing out the ice cream from the scoop portion. To do so, the pushing portion is usually configured to be movable relative to the scoop portion such that the ice cream can be pushed out of the scoop portion by the pushing portion. However, the pushing portion of currently available scoops is usually mounted on the handle or on the scoop portion in such a manner that the pushing portion cannot be detached from the rest of the scoop, which adds difficulty in the cleaning of the scoops. In addition, for the currently available scoops, after the ice cream is pushed out of the scoop portion, the pushing portion needs to be manually returned to its original position for scooping another piece of ice cream. It would be desirable if this returning operation is automatic, in other words, if the pushing portion can automatically return to its original position after use.

SUMMARY OF THE INVENTION

The present invention has a principle object of providing a scoop for foodstuff, especially ice cream, comprising a pushing portion which is able to provide a user with an ease of cleaning the scoop. Another object of this invention is to provide a foodstuff scoop, particularly an ice cream scoop that provides easier and simpler adjustment of the position of the pushing portion.

These and other objects are satisfied by the present invention, which provides a scoop for foodstuff, especially ice cream, comprising two parts that can be detached from each other and assembled together in an easy and convenient manner.

In one preferred embodiment of the present invention, the scoop for foodstuff comprises:

a handle having a proximal end and a distal end, a scoop portion attached to the proximal end of the handle and adapted for scooping the foodstuff, and an retractable pushing portion detachably mounted on the handle, the pushing portion configured to extend relative to the scoop portion to an active position where the pushing portion is able to push the foodstuff out of the scoop portion, and retract to an inactive position after use where the pushing portion is held in place.

In one embodiment of the present invention, the pushing portion comprises a pushing piece at a proximal end configured for pushing the foodstuff out of the scoop portion, and a coupling detachably connected to the handle. The pushing portion may further comprise a retractable member connected between the pushing piece and the coupling, the retractable member can extend the pushing piece to the active position and automatically retract the pushing piece to the inactive position after use. Preferably, the retractable member is made of an elastic material, which is forced to extend the pushing piece and retracts the pushing piece after the force is removed. The retractable member may be made of silica gel.

In one preferred embodiment of the present invention, the coupling is provided as a stub detachably received in an orifice formed at the distal end of the handle. Preferably, the coupling is received in the orifice by interference fit or by snap fit.

In one embodiment of the present invention, the pushing piece may comprise a pushing member having an outer surface profiled to be flush with an inner surface of the scoop portion in the inactive position, thereby the outer surface of the pushing member is completely flat with inner surface of the scoop portion. Advantageously, an undercut area is formed on the scoop portion for movably holding the pushing member when the pushing piece is in the inactive position, the undercut area is adapted such that the outer surface of the pushing piece is flush with the inner surface of the scoop portion.

In one embodiment of the present invention, a longitudinal groove is formed on the handle for snugly receiving at least a part of the pushing portion, preferably the retractable member, in a flush fashion.

In another embodiment of the present invention, the retractable member has a raised portion in the vicinity of the pushing piece, onto which a force is applied to extend the pushing piece to the active position, and the pushing piece automatically retracts to the inactive position after the force is removed. Accordingly, the pushing piece comprises a bulge fittable into a cavity formed inside the raised portion, such that the pushing piece is connected with the retractable member. In some cases, a plurality of protrusions are formed on a bottom surface of the retracting member in the vicinity of the first end thereof, which protrusions are inserted into a plurality of troughs, respectively, formed on a top surface of the pushing piece.

In one embodiment of the present invention, a passage is formed inside the handle and extends inwardly from the proximal end of the handle, the scoop portion is fixedly received in the passage. The passage may be formed by a flat top wall and a curved bottom wall of the handle. In some cases, the scoop portion may comprise an inserting portion which is fixedly inserted into the passage to enable the attachment of the scoop portion to the proximal end of the handle. Further, the pushing piece may comprise a guiding member, which is slidably received in a space defined by a slot formed in the inserting portion of the scoop portion and the top wall of the handle.

In one embodiment of the present invention, the scoop portion is fixedly received in the passage of the handle by a locking member. The locking member may comprise a pair of pins which are inserted into both a pair of first holes formed on the inserting portion of the scoop portion, and a pair of second holes formed through the top wall of the handle for fixedly locking the scoop portion in the handle.

Due to the retractability of the retractable member which enables the pushing portion to extend and retract between the active position and the inactive position, the invention eliminates the need of manually returning the pushing portion to the inactive position. Also the pushing portion is detachably mounted in the scoop, it is easy to detach the pushing portion for the cleaning purpose.

DETAILED DESCRIPTION OF THE INVENTION

While this invention is illustrated and described in a preferred embodiment, the scoop for foodstuff of the present invention may be produced in many different configurations, sizes, forms and materials.

For the sake of clarity and convenience, "ice cream scoop" is taken herein as one example of the foodstuff scoops. It would be appreciated that any other kinds of foodstuff scoops are applicable.

Figure 1:
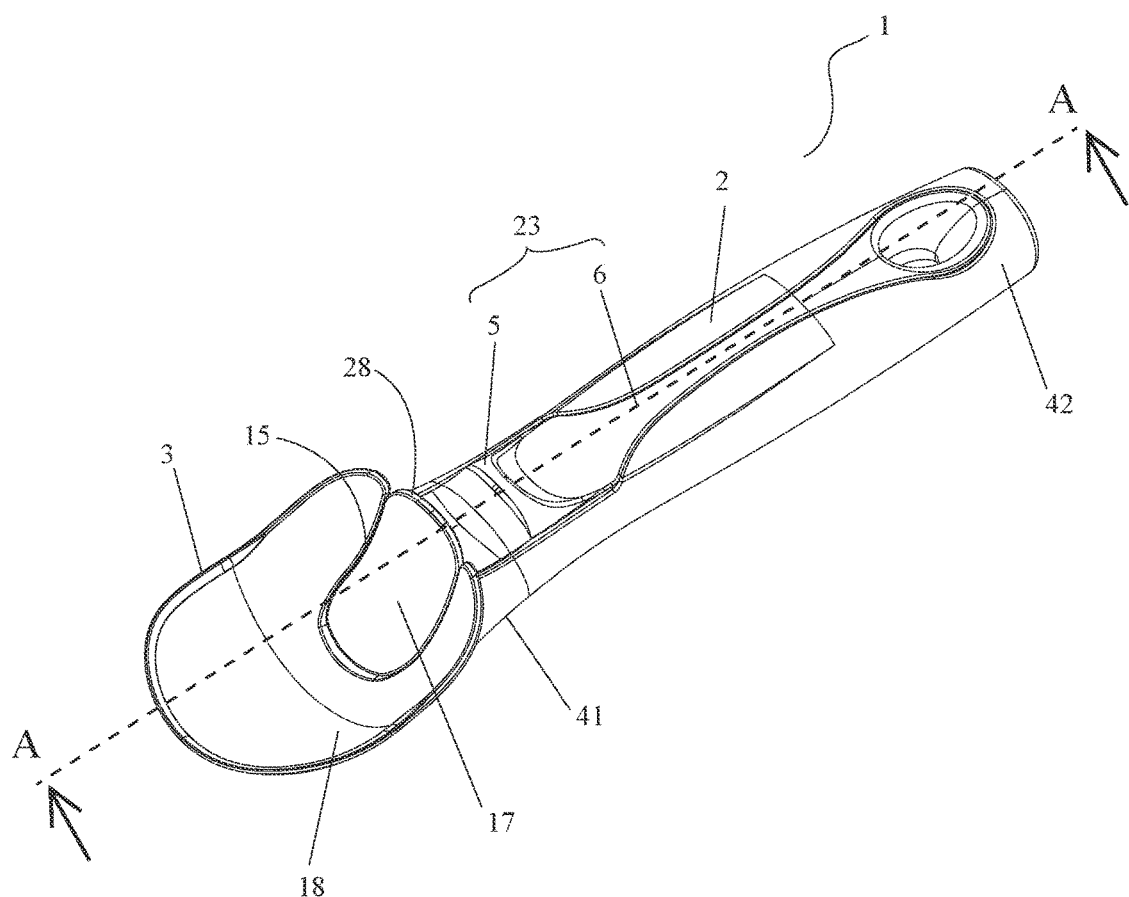
FIG. 1 is a perspective view of an ice cream scoop constructed according to an embodiment of the present invention with the pushing piece in the inactive position.

Referring now to the drawings, FIG. 1 illustrates in a perspective view a scoop for scooping ice cream configured according to a preferred embodiment of the present invention. The scoop 1 comprises a handle 2 having a proximal end 41 and a distal end 42, a scoop portion 3 attached to the proximal end 41 of the handle 2, and a pushing portion 23 having a pushing piece 5, a coupling 62, and a retractable member 6 connected between the pushing piece 5 and the coupling 62, said pushing portion 23 being detachably mounted on the handle 2.

Figure 2:
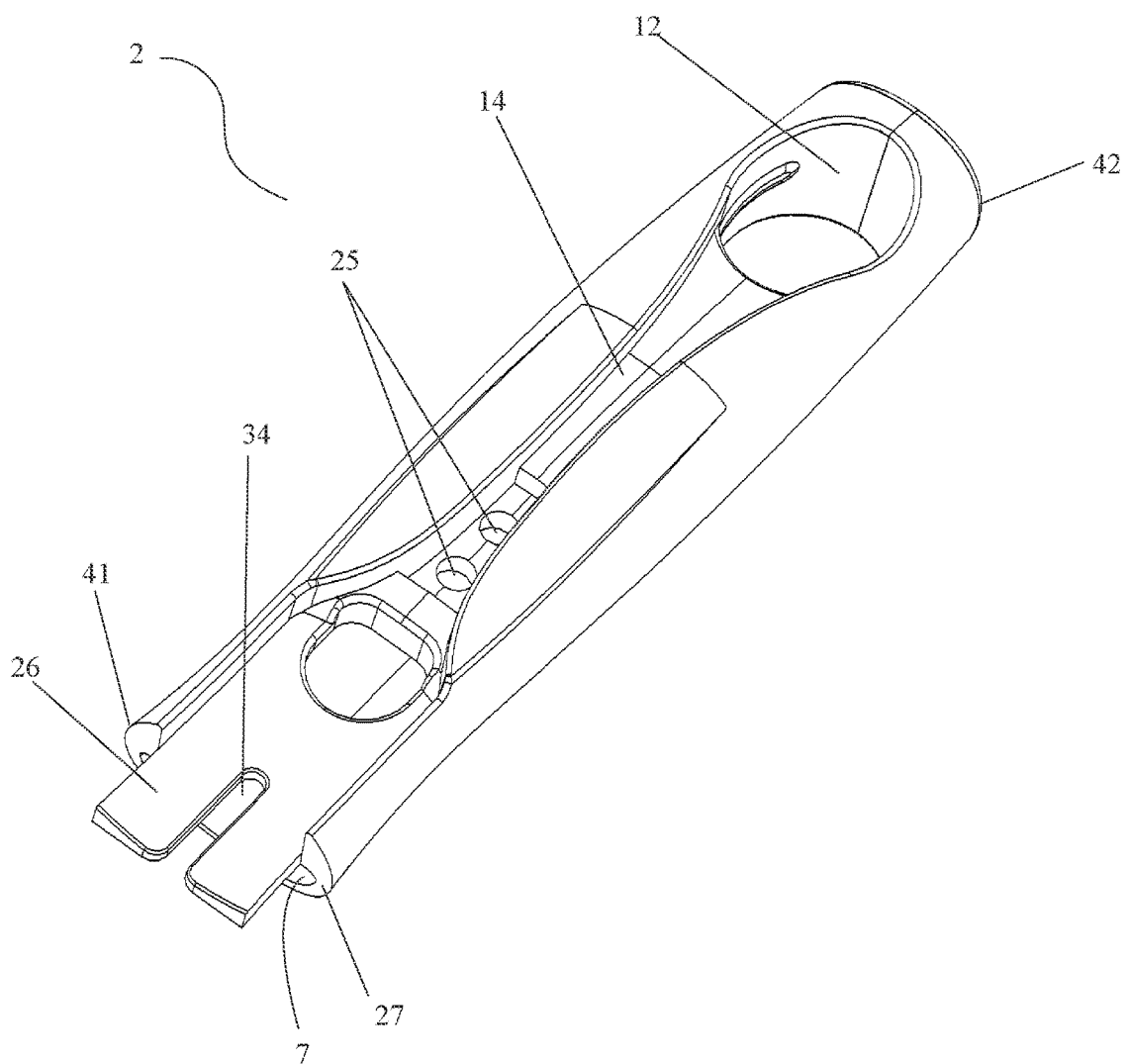
FIG. 2 is a perspective view of the handle of the scoop shown in FIG. 1, with the pushing member removed.

In this embodiment, the handle 2 is in the shape of a long stick and adapted for being held by a hand of the user. Preferably, the handle 2 is made of plastic. As can be seen in FIG. 2, the handle 2 comprises a passage 7 formed by a flat top wall 26 and a curved bottom wall 27, the passage 7 extending inwardly from the proximal end 41 into the handle 2.

As shown in FIG. 1, the scoop portion 3 is attached fixedly to the proximal end 41 of the handle 2 and is adapted for scooping ice cream. To be specific, the scoop portion 3 generally has the shape of a bowl. In other words, the scoop portion 3 has a concave inner surface 18. The scoop portion 3 may be made of any material, for example stainless steel. Such a configuration is especially suitable for scooping ice cream.

Figure 3:
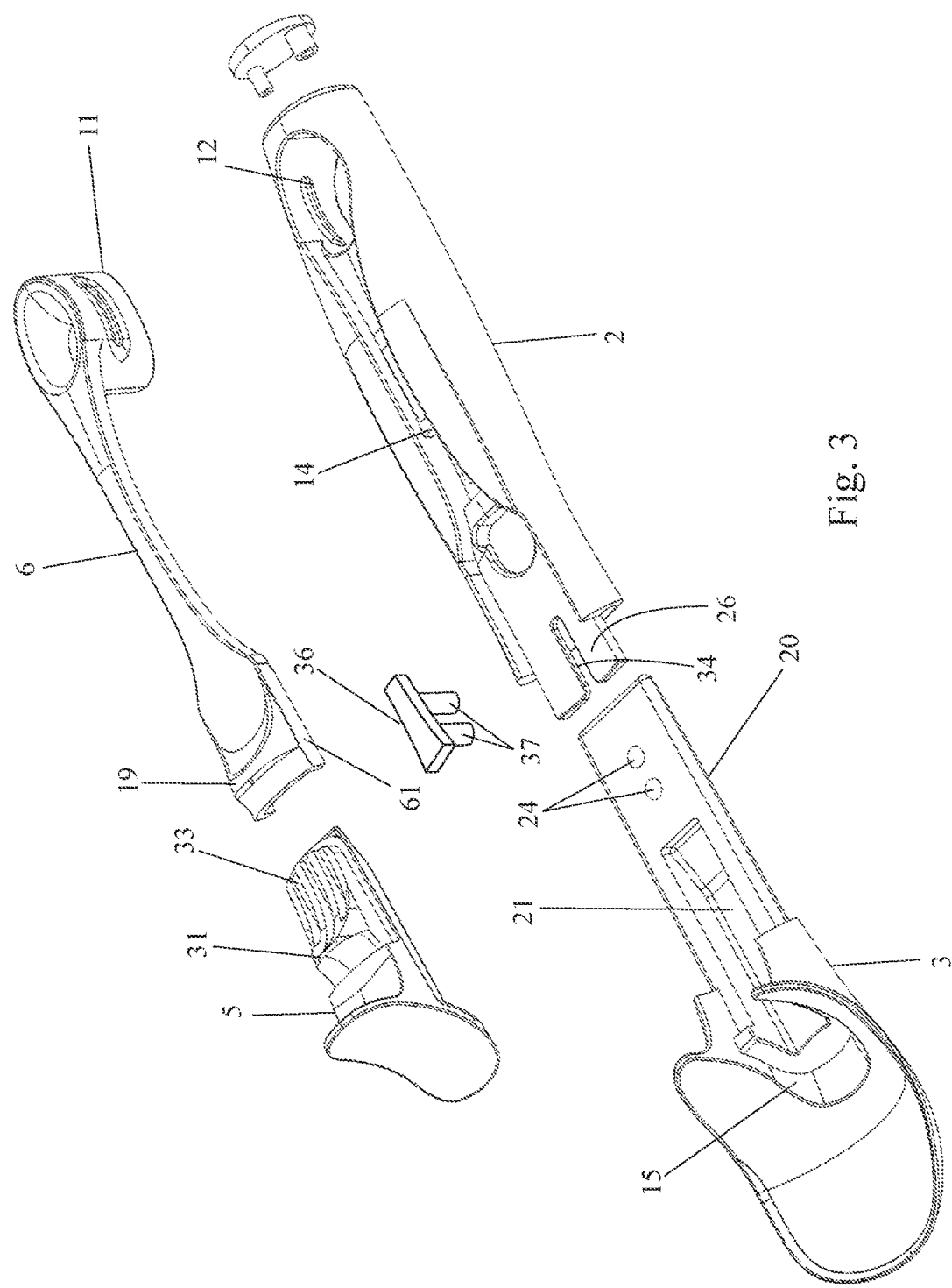
FIG. 3 is a top exploded perspective view of the scoop shown in FIG. 1.
Figure 4:
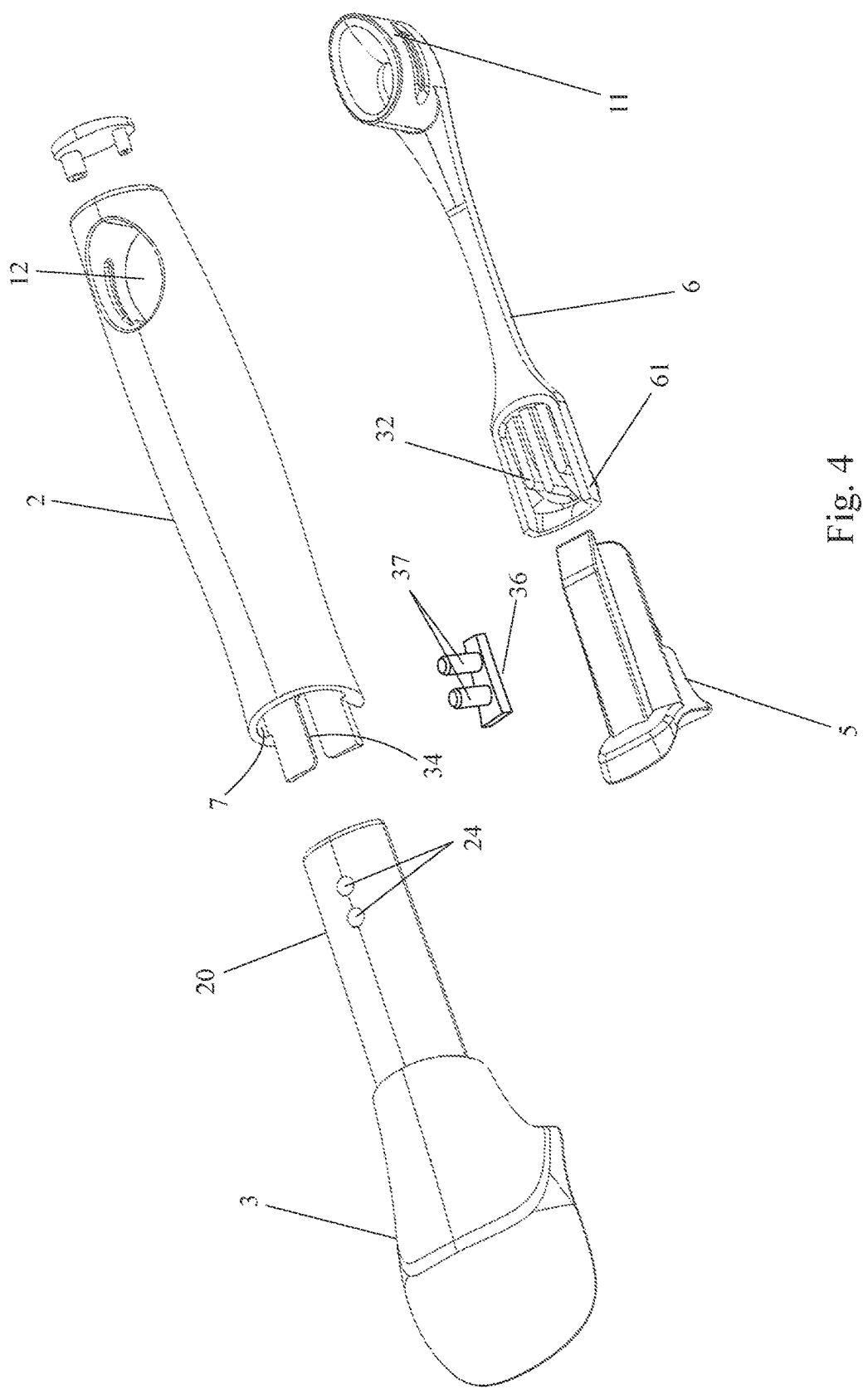
FIG. 4 is a bottom exploded perspective view of the scoop shown in FIG. 1.

As can be seen in FIGS. 3 and 4, the scoop portion 3 further comprises a long flat inserting portion 20 which is inserted into the passage 7 of the handle 2 in order to attach the scoop portion 3 to the proximal end 41 of the handle 2 in a fixed manner. To be specific, a pair of first holes 24 are formed traversely the inserting portion 20. Correspondingly, a pair of second holes 25 (see FIG. 2) are formed traversely through the top wall 26 to be in communication with the passage 7 of the handle 2. The positions of the two pairs of holes 24 and 25 are arranged in such a manner that when the inserting portion 20 is completely inserted into the passage 7, the pair of first holes 24 are aligned with the pair of second holes 25. A locking member 36 having a pair of pins 37 are provided to secure the scooping portion 3 on the handle 2 by inserting the pair of pins 37 into the aligned pairs of first holes 24 and second holes 25.

Figure 5:
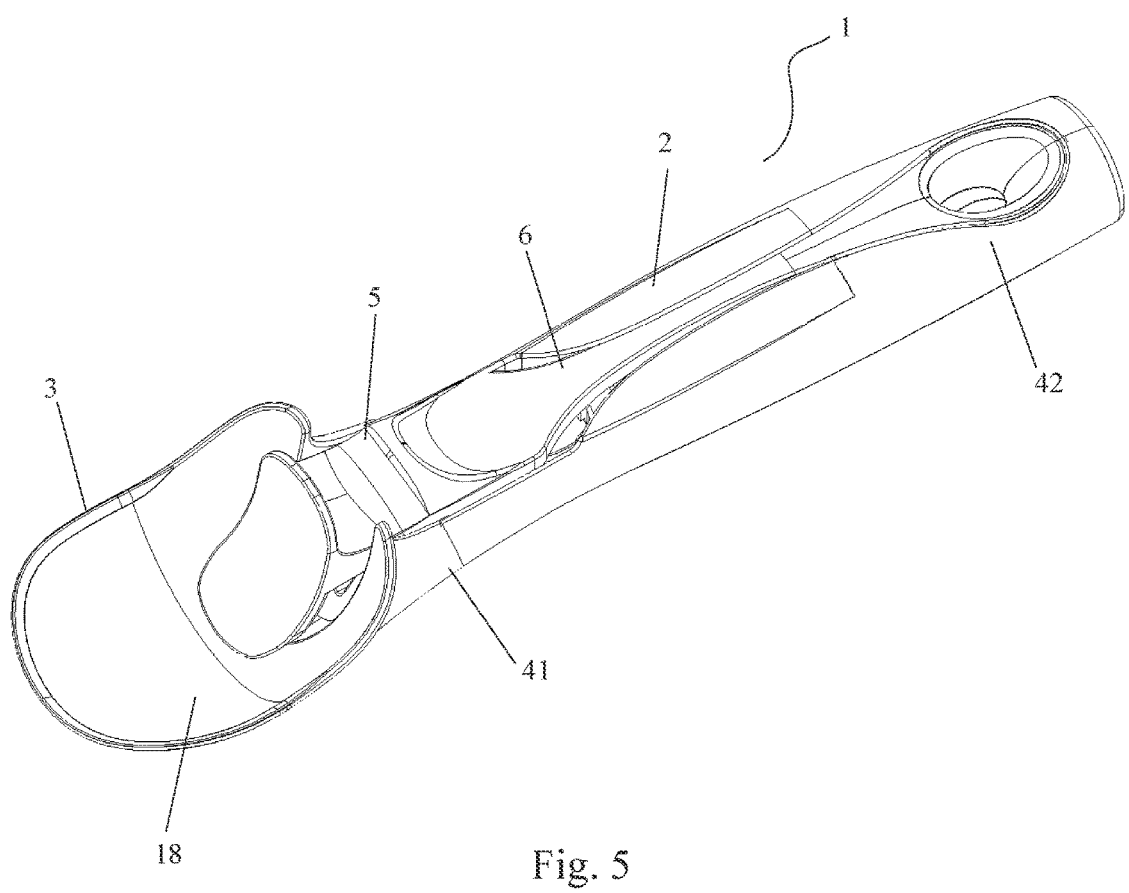
FIG. 5 is a perspective view of the scoop shown in FIG. 1 with the pushing piece in the active position.
Figure 6:
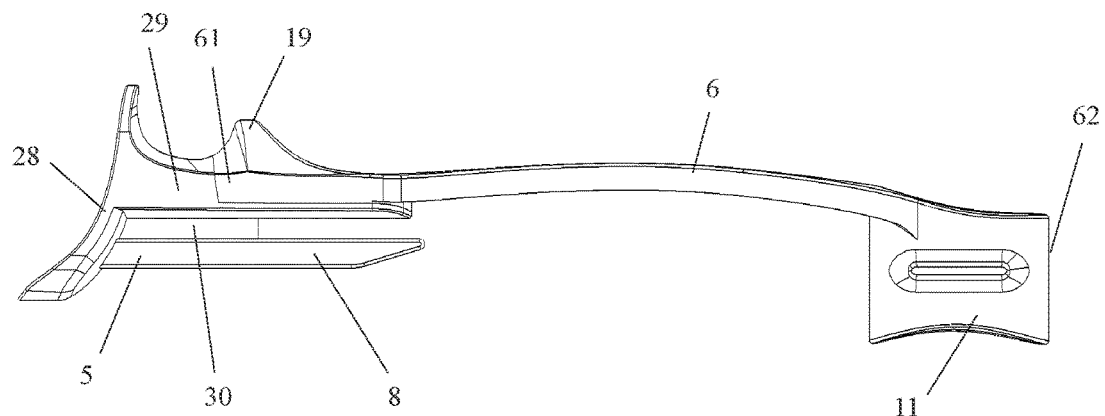
FIG. 6 is a side front elevation view of the pushing portion of the scoop shown in FIG. 1.

As can be best seen in FIG. 1, the pushing piece 5 is mounted on the proximal end 41 of the handle 2 and is coupled with the retractable member 6 which is also mounted on the handle 2. The pushing piece 5 is configured to be movable between an inactive position (as shown in FIG. 1) and an active position (as shown in FIG. 5). When the pushing piece 5 is moved from the inactive position to the active position, the scooped ice cream (not shown) is pushed out of the scoop portion 3 by the pushing piece 5. As shown in FIG. 6, a leading portion 61 of the retractable member 6 is connected to the pushing piece 5 for moving the pushing piece 5 from the active position to the inactive position. The coupling 62 is detachably mounted at the distal end 42 of the handle 2. In this embodiment, the coupling 62 is formed as a stub 11 mounted into an orifice 12 (for example, a through hole) formed at the distal end 42 of the handle 2 by interference fit or by snap fit. In other words, the stub 11 enables the retractable member 6 to detachably connect the pushing portion 23 to the handle 2. The retractable member 6 is made of an elastic material, preferably silica gel, while the pushing piece 5 is preferably made of plastic or a metal. The retractable member 6 is configured to be movable between an operative position (as shown in FIG. 5) where the pushing piece 5 is in the active position for pushing out the ice cream, and an inoperative position (as shown in FIG. 1) where the pushing piece 5 is in the inactive position. In other words, due to the presence of the elasticity, the retractable member 6 may extend to move the pushing piece 5 to the active position (as shown in FIG. 5) and automatically retract the pushing piece 5 to the inactive position after the force is released (as shown in FIG. 1). Those skilled in the art will understand that it is possible that the retractable member 6 may be of collapsible structure or spring structure to achieve the same effect of automatically retracting the pushing piece 5 in the longitudinal direction of the handle.

Figure 7:
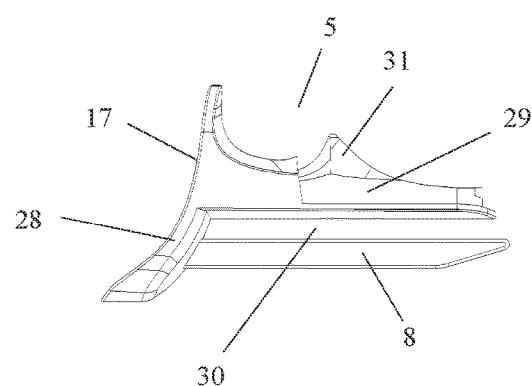
FIG. 7 is a side front elevation view of the pushing piece of the scoop shown in FIG. 1.

The pushing piece 5 is adapted for pushing the scooped ice cream away from the scoop portion 3. Now referring to FIG. 7, the pushing piece 5 comprises a pushing member 28 having a slightly concave outer surface 17, which is in contact with the ice cream and profiled to be flush with the concave inner surface 18 of the scoop portion 3 and thus forms a part of the inner surface 18 of the scoop portion 3 when the pushing piece 5 is in the inactive position (see FIG. 1). The pushing piece 5 further comprises a guiding member 8 for the mounting of the pushing piece 5 onto the handle 2. The guiding member 8 is generally in the shape of a long and flat plate extending from a side of the pushing member 28 opposite to the outer surface 17. Furthermore, the pushing piece 5 comprises a connecting member 29 which is generally configured as a flat plate and extends parallel with and above the guiding member 8. A linking member 30 is provided to connect the guiding member 8 and the connecting member 29.

The pushing piece 5 is fixedly connected with the leading portion 61 of the retractable member 6 by any method commonly known in the art, such as by sticking, molding, etc. In this embodiment, a bulge 31 is formed on a top surface of the connecting member 29. Correspondingly, a raised portion 19 is formed in the leading portion 61 of the retractable member 6 (see FIGS. 3 and 6), namely in the vicinity of the pushing piece 5. Therefore, when the pushing piece 5 is attached to the leading portion 61 of the retractable member 6, the bulge 31 is fitted within a cavity formed inside the raised portion 19, thereby reinforcing the connection between the pushing piece 5 and the retractable member 6. The raised portion 19 serves to facilitate pushing of the pushing piece 5 by the hand (for example, the thumb) of the user when the thumb presses against the raised portion 19, and also to provides the ease of stretching/extending the retractable member 6 tight in the longitudinal direction of the handle 2. In addition, as shown in FIGS. 3 and 4, a plurality of protrusions 32 are formed on a bottom surface of the retractable member 6 in the leading portion 61 thereof, which protrusions are inserted into a plurality of troughs 33, respectively, formed on the top surface of the connecting member 29, to further reinforce the connection between the pushing piece 5 and the retractable member 6.

Turning to FIG. 3, a slot 21 is formed on a top surface of the inserting portion 20 of the scoop portion 3. The slot 21 together with the top wall 26 of the handle 2 provides a space for accommodating the guiding member 8 of the pushing piece 5 and defines the passage for the movement of the guiding member 8 in the direction along the length of the handle 2. In other words, the pushing piece 5 can be mounted onto the handle 2 by inserting the guiding member 8 into the space defined by the slot 21 and the top wall 26 of the handle 2 (see FIGS. 8 and 9). The slot 21 also ensures that the stretching/extending movement of the retractable member 6 is in the longitudinal direction, so that the pushing piece 5 is movable longitudinally between the active position and the inactive position. A slit 34 is cut to pass through the top wall 26 and positioned to correspond to the linking member 30 of the pushing piece 5, in which slit the linking member 30 is received and guided to move in the longitudinal direction of the handle.

Figure 8:
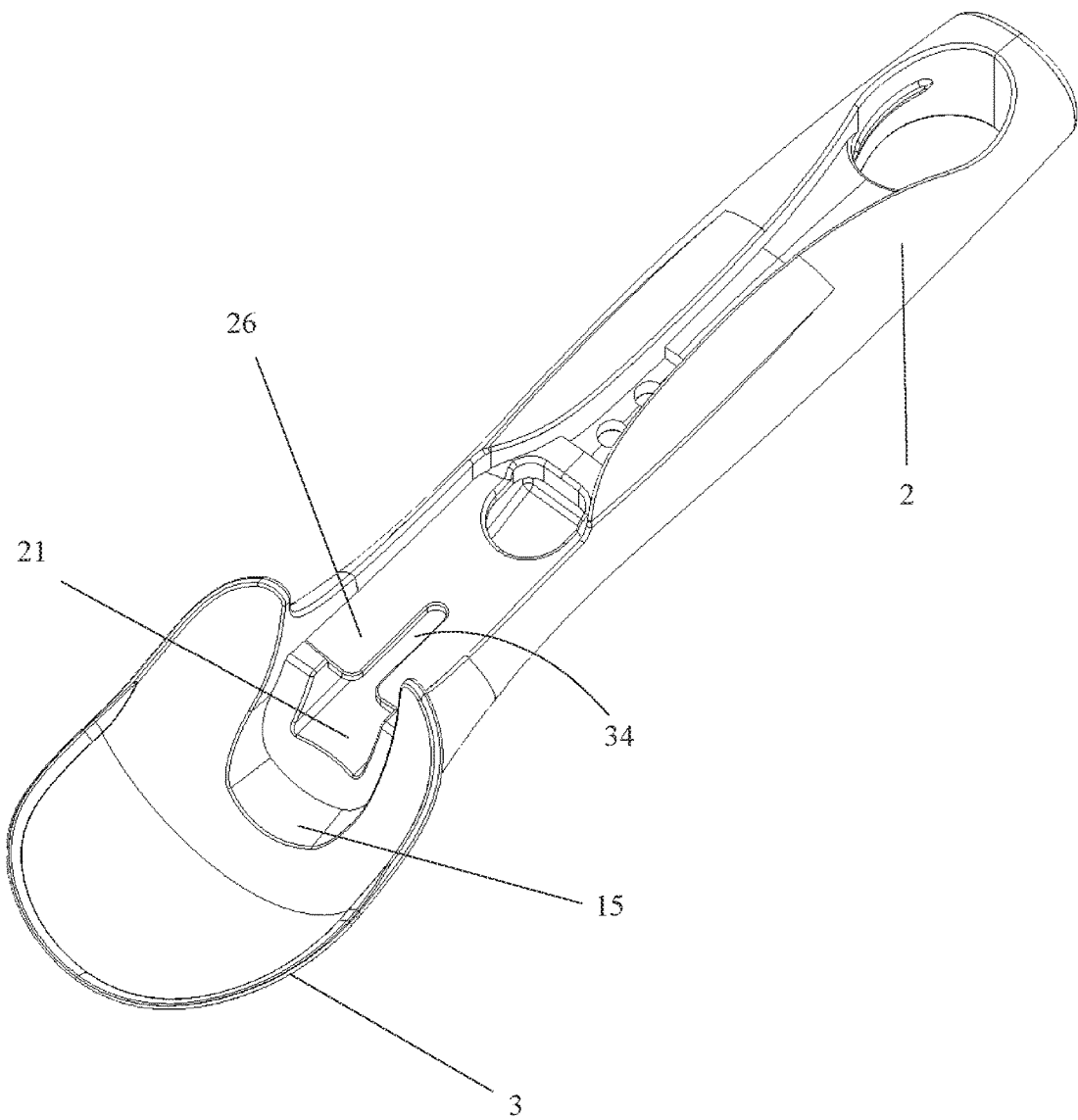
FIG. 8 is a perspective view of the scoop shown in FIG. 1 with the pushing portion removed.
Figure 9:
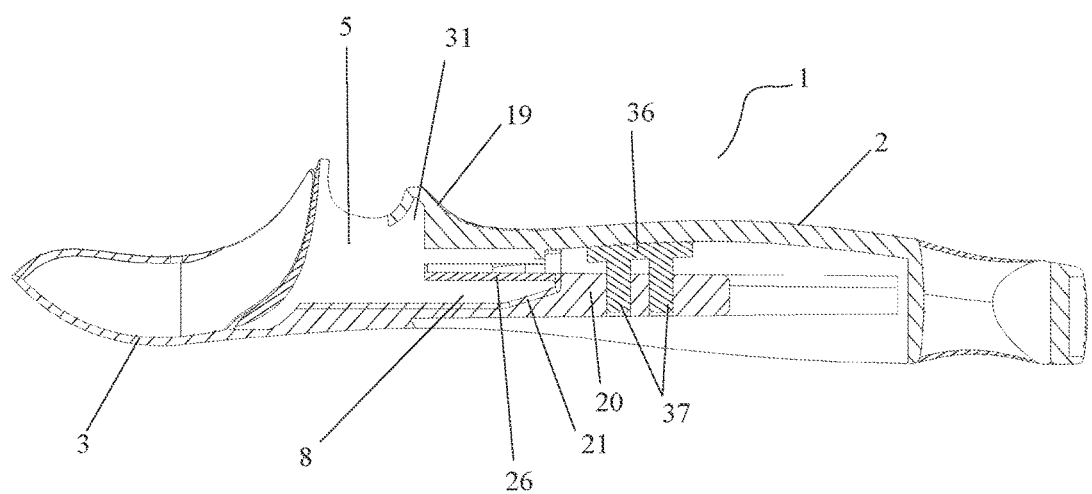
FIG. 9 is a cross-sectional view of the scoop shown in FIG. 1 cut along line A-A.

As shown in FIGS. 3 and 8, the scoop portion 3 comprises an undercut area 15 formed therein for movably holding the pushing member 28 of the pushing piece 5 when the pushing piece 5 is in the inactive position. The undercut area 15 is sized and shaped to hold the pushing member 28 in such a manner that the outer surface 17 of the pushing member 28 together with the inner surface 18 of the scoop portion 3 constitutes a hemispherical or a semi-elliptical surface (see FIG. 1). As shown, the pushing member 28 fits into the undercut area 15, with the outer surface 17 of the pushing member 28 being flush with the concave inner surface 18 of the scooping portion 3. Such a configuration ensures that the scooped ball of ice cream will have a smooth surface, and therefore the scooped ball of ice cream would have a perfect shape.

Now referring to FIGS. 2 and 3, the handle 2 comprises a groove 14 formed lengthways on an outer surface thereof. At an end of the groove 14 which is away from the proximal end 41 of the handle 2, an orifice 12 is formed running through the handle 2 in a direction perpendicular to the length thereof. The groove 14 and the orifice 12 are formed for snugly receiving the retractable member 6. The stub 11 coupled with the retractable member 6 is interference-fitted or snap-fitted into the orifice 12 such that the stub 11 is fully retained within the orifice 12 and that the retractable member 6 is snugly received in the groove 14 in a flush fashion (see FIG. 1). As such, the handle 2 is configured to have a smooth surface after the retractable member 6 is assembled into the handle. The stub 11 may be formed to have a central through hole allowing for hanging the scoop 1 on a hook, for example.

FIG. 5 shows the active position of the pushing piece 5 where the pushing piece 5 is moved relative to the scoop portion 3 to push the scooped ice cream (not shown) out of the scoop portion 3. As the pushing piece 5 is forced (for example, by pressing the raised portion 19 with the hand of the user) to move in a direction away from the handle 2, the retractable member 6 is caused to stretch and extend to become taut against the elasticity thereof. When the scooped ice cream has been removed from the scoop portion 3 and the force applied to the pushing piece 5 is released, the elasticity of the retractable member 6 would cause the pushing piece 5 to automatically move back towards the distal end 42 of the handle 2 until the pushing member 28 is again fitted within the undercut area 15 to be held in place (that is, back into the inactive position shown in FIG. 1). In other words, the elasticity of the retractable member 6 enables to automatically retract the pushing piece 5 as soon as the external force applied to the pushing piece 5 is released.

The pushing portion 23 can be easily detached from the handle 2 by firstly removing the stub 11 from the orifice 12, in a direction perpendicular to the length of the handle 2, and then moving the pushing portion 23 longitudinally in a direction away from the handle 2 and towards the scoop portion 3, until the guiding member 8 is completely out of the space defined by the slot 21 of the scoop portion 3 and the top wall 26 of the handle 2. On the other hand, the pushing portion 23 can be easily mounted onto the handle 2 by firstly inserting the guiding member 8 into the space defined by the slot 21 and the top wall 26, and then snap-fitting the stub 11 into the orifice 12 and the rest of the retractable member 6 into the groove 14. The easy mounting and dismounting of the pushing portion 23 facilitate the convenient cleaning of the scoop 1, especially the cleaning of the interior of the scoop 1.

While the present invention is described in connection with what is presently considered to be the most practical and preferred embodiment, it should be appreciated that the invention is not limited to the disclosed embodiment, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1 scoop
2 handle
3 scoop portion
5 pushing piece
6 retractable member
7 passage
8 guiding member
11 stub
12 orifice
14 groove
15 undercut area
17 outer surface of pushing member
18 inner surface of scoop portion
19 raised portion of retractable member
20 inserting portion
21 slot
23 pushing portion
24 first holes
25 second holes
26 top wall of the handle
27 bottom wall of the handle
28 pushing member
29 connecting member
30 linking member 31 bulge
32 protrusions
33 troughs
34 slit
36 locking member
37 pins
41 proximal end of the handle
42 distal end of the handle
61 leading portion of retractable member
62 coupling

The invention claimed is:

1. A scoop (1) for foodstuff, comprising:
a handle (2) having a proximal end (41) and a distal end (42),
a scoop portion (3) attached to the proximal end (41) of the handle (2) and adapted for scooping the foodstuff, and
a retractable pushing portion (23) detachably mounted on the handle (2), the pushing portion (23) configured to be stretchable in a direction along the length of the scoop (1) relative to the scoop portion (3) to an active position where the pushing portion is able to push the foodstuff out of the scoop portion (3), and retract to an inactive position after use where the pushing portion is held in place.

2. The scoop (1) of claim 1, wherein the pushing portion (23) comprises a pushing piece (5) at a proximal end configured for pushing the foodstuff out of the scoop portion (3), and a coupling detachably connected to the handle (2).

3. The scoop (1) of claim 2, wherein the pushing portion (23) further comprises a retractable member (6) connected between the pushing piece (5) and the coupling, the retractable member (6) is able to extend the pushing piece (5) to the active position and automatically retract the pushing piece (5) to the inactive position after use.

4. The scoop (1) of claim 3, wherein the retractable member (6) is made of an elastic material, which is forced to extend the pushing piece (5) and retracts the pushing piece (5) after the force is removed.

5. The scoop (1) of claim 4, wherein the retractable member (6) is made of silica gel.

6. The scoop (1) of claim 2, wherein the coupling is provided as a stub (11) detachably received in an orifice (12) formed at the distal end (42) of the handle (2).

7. The scoop (1) of claim 6, wherein the coupling is received in the orifice (12) by interference fit or by snap fit.

8. The scoop (1) of claim 2, wherein the pushing piece (5) comprises a pushing member (28) having an outer surface (17) profiled to be flush with an inner surface (18) of the scoop portion (3) in the inactive position, thereby the outer surface (17) of the pushing member (28) is completely flat with inner surface (18) of the scoop portion (3).

9. The scoop (1) of claim 8, wherein an undercut area (15) is formed on the scoop portion (3) for movably holding the pushing member (28) when the pushing piece (5) is in the inactive position, the undercut area (15) is adapted such that the outer surface (17) of the pushing piece (5) is flush with the inner surface (18) of the scoop portion (3).

10. The scoop (1) of claim 3, wherein a longitudinal groove (14) is formed on the handle (2) for snugly receiving at least a part of the pushing portion (23), in a flush fashion.

11. The scoop (1) of claim 3, wherein the retractable member (6) has a raised portion (19) in the vicinity of the pushing piece (5), onto which a force is applied to extend the pushing piece (5) to the active position, and the pushing piece (5) automatically retracts to the inactive position after the force is removed.

12. The scoop (1) of claim 11, wherein the pushing piece (5) comprises a bulge (31) fittable into a cavity formed inside the raised portion (19), such that the pushing piece (5) is connected with the retractable member (6).

13. The scoop (1) of claim 12, wherein a plurality of protrusions (32) are formed on a bottom surface of the retractable member (6) in the leading portion (61) thereof, which protrusions are inserted into a plurality of troughs (33), respectively, formed on a top surface of the pushing piece (5).

14. The scoop (1) of claim 1, wherein a passage (7) is formed inside the handle (2) and extends inwardly from the proximal end (41) of the handle (2), the scoop portion (3) is fixedly received in the passage (7).

15. The scoop (1) of claim 14, wherein the passage (7) is formed by a flat top wall (26) and a curved bottom wall (27) of the handle (2).

16. The scoop (1) of claim 15, wherein the scoop portion (3) comprises an inserting portion (20) which is fixedly inserted into the passage (7) to enable the attachment of the scoop portion (3) to the proximal end (41) of the handle (2).

17. The scoop (1) of claim 16, wherein the pushing piece (5) comprises a guiding member (8), which is slidably received in a space defined by a slot (21) formed in the inserting portion (20) of the scoop portion (3) and the top wall (26) of the handle (2).

18. The scoop (1) of claim 14, wherein the scoop portion (3) is fixedly received in the passage (7) of the handle (2) by a locking member (36).

19. The scoop (1) of claim 18, wherein the locking member (36) comprises a pair of pins (37) which are inserted into both a pair of first holes (24) formed on the inserting portion (20) of the scoop portion (3), and a pair of second holes (25) formed through the top wall (26) of the handle (2) for fixedly locking the scoop portion (3) in the handle (2).

20. The scoop (1) of claim 10, wherein said at least a part of the pushing portion (23) is the retractable member (6).

* * * * *